United States Patent
Fujio

[15] 3,641,732
[45] Feb. 15, 1972

[54] METHOD OF PACKAGING PACKS OR ARTICLES WITH A HEAT-SHRINKING MATERIAL

[72] Inventor: Masaaki Fujio, 3-15-8 Aoyamadai, Suita, Japan
[22] Filed: Mar. 5, 1970
[21] Appl. No.: 16,896

[52] U.S. Cl..................................53/14, 53/30, 229/51 TS, 229/66
[51] Int. Cl....................................B65b 61/18, B65d 65/32
[58] Field of Search..............53/14, 30; 93/1 TS; 229/51 TS, 229/51 S, 51 AS, 66, 85, 86

[56] References Cited

UNITED STATES PATENTS

| | | | |
|---|---|---|---|
| 3,371,462 | 3/1968 | Nordkvist et al.......................53/30 X |
| 3,497,131 | 2/1960 | Tracy......................................229/66 |
| 2,851,212 | 9/1958 | Parmer...................................229/66 |
| 3,429,495 | 2/1969 | McClosky...........................229/66 X |
| 3,516,537 | 6/1970 | Dreyfus et al........................229/66 X |

*Primary Examiner*—Theron E. Condon
*Assistant Examiner*—Neil Abrams
*Attorney*—Jacobi, Lilling and Siegel

[57] ABSTRACT

A method of packaging packs or other articles with a heat-shrinking material is disclosed whereby a tear-tab is automatically formed protruding sideways from each package. The method comprises wrapping a pack or article with a sheet of overwrap of synthetic resin film which tends to shrink when heated. The open sides of the overwrap are heat-sealed thereby hermetically sealing the wrap. At the same time, a laminate of the front and rear part of the overwrap is formed by fusion with heat at a suitable portion on a side of the overwrap. Then, the overwrap is heated thereby allowing it to shrink in such manner that the entire overwrap excepting the laminated portion shrinks close to the outer surface of the pack or article and that the inner edge of the laminated portion is supported by the outer surface of the pack or article in the direction at a right angle thereto thereby allowing the laminated part to extend outwardly.

7 Claims, 8 Drawing Figures

PATENTED FEB 15 1972 3,641,732

INVENTOR
Masaaki Fujio

BY Jacobi, Davidson, Lilling & Siegel
ATTORNEY

PATENTED FEB 15 1972 3,641,732

INVENTOR
Masaaki Fujio

BY Jacobi, Davidson, Lilling & Siegel
ATTORNEY

METHOD OF PACKAGING PACKS OF ARTICLES WITH A HEAT-SHRINKING MATERIAL

This invention relates, in a broad sense, to a method of packaging with the use of a heat-shrinking material such as the synthetic resin film that tends to shrink when heated. Specifically the invention relates to a method of packaging products with a heat-shrinking material by heating the material thereby allowing it to shrink into intimate contact with the contents while projecting a part of the material automatically to form tear tabs which enable the resulting package to be torn open with little effort.

Packages of paperboard cartons, bottles and other containers, and also unpackaged products themselves, overwrapped with heat-shrinking synthetic resin film for both additional protective and decorative effects have a common disadvantage in that the overwraps stick so closely to the underlying surfaces and are in such tension that they are difficult to tear when the packages must be torn open.

In an effort to facilitate the tearing of the overwraps, it has been proposed to form perforations along all sides or peripheral margins of the overwraps. The advantage thus derived, however, is offset by the poor appearance presented by the perforations enlarged by the thermal contraction of the overwraps and by the ingress of dirt and other foreign matter into the packages through the fairly enlarged holes.

Another approach to the problem has been to perform a projecting tear tab or tabs on part of an overwrap. It requires additional labor and complicates the material cutting, with decreased yield. Moreover, where the thickness of the overwrapping film is not thick enough, the tabs tend to be broken or torn off to a disadvantage.

This invention concerns a method of packaging with a heat-shrinking material whereby tough and yet ready-to-tear tabs are formed by themselves upon thermal contraction of the overwrap, despite the fact that the overwrap material is not cut into the shape and size with any preformed tab.

The invention will now be described in further detail with reference to the accompanying drawings showing embodiments thereof. In the drawings.

Figure 5:
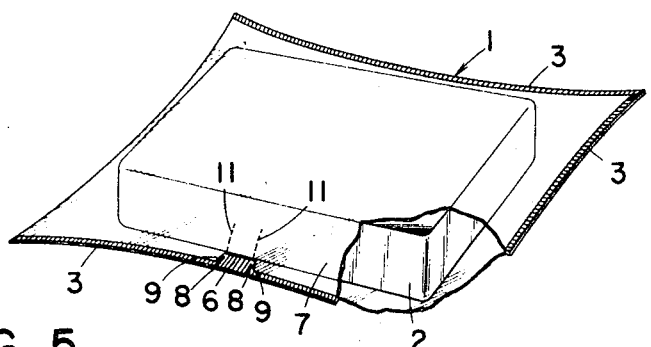
Figure 6:
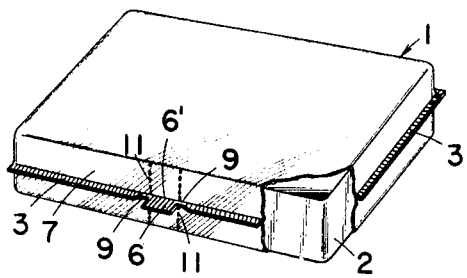
Figure 7:
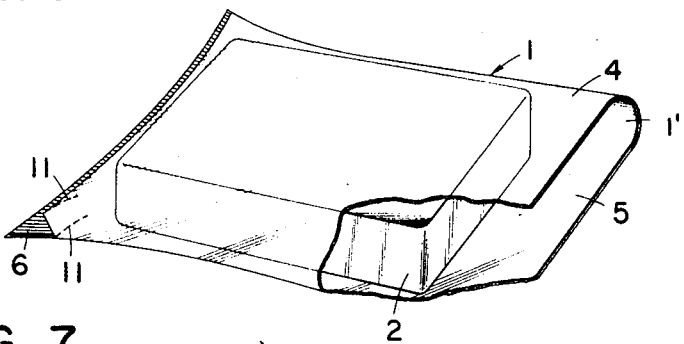
Figure 8:
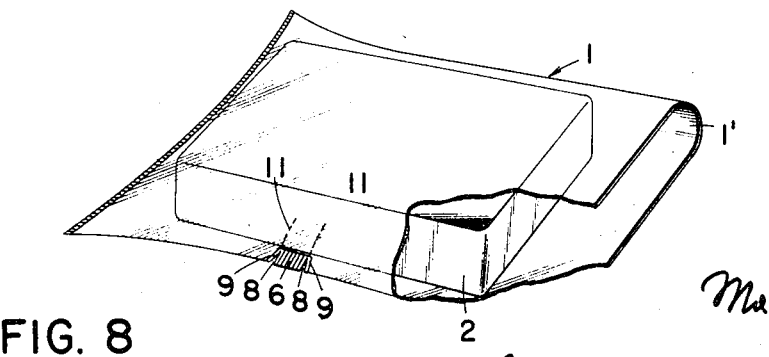

FIGS. 5 and 6 show another embodiment of the invention, FIG. 5 being a perspective view, partly broken away, of the overwrap sealed at three sides thereby enclosing the article therein, and FIG. 6 being a perspective view, partly broken away, of a package formed in accordance with the invention; and FIGS. 7 and 8 are perspective views, partly broken away, of overwraps in the form of bags in which articles to be packaged are enveloped.

Figure 1:
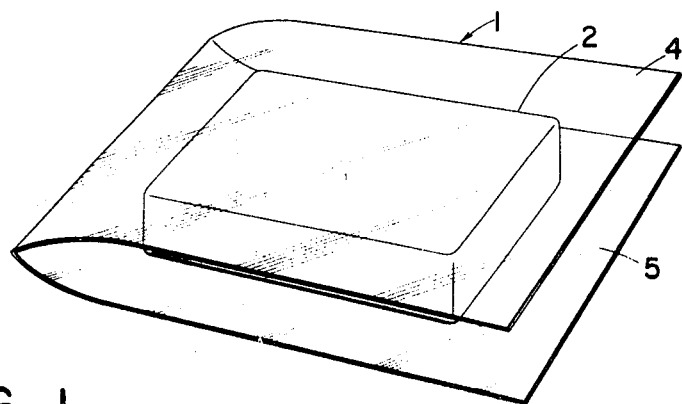
FIG. 1 is a perspective view of a sheet of overwrap material folded in two to sandwich an article to be packaged.

As shown in FIG. 1, a rectangular sheet of overwrap 1 consisting of a synthetic resin film having a heat-shrinking tendency is folded in two layers to sandwich an item to be packaged such as a pack 2. Next, the three open sides of the overwrap 1 are heat sealed as at 3 by a three-side sealer, excess film is trimmed off, and the front part 4 and the rear part 5 of the overwrap 1 are fused together at a desirable corner to form a triangular tab 6. Then, the overwrap 1 is heated to shrink into close contact with the outer surface of the pack 2.

With the contraction of the overwrap 1, the tab 6 is drawn close to the pack 2 until its inner edge 6' contacts the corner of the pack 2. Formed of the front part 4 and the rear part 5 fused together, the tab 6 itself shrinks little as compared with the rest of the overwrap 1. For this reason, when the overwrap 1 has stuck completely to the surface of the pack 2, the tab 6 remains protruded outwardly from the pack 2 at a right angle thereto, with the inner edge 6' supported by the corner of the pack 2.

The tab 6 may be provided in a suitable number, shape and location. For example, such tabs may be formed at two or more corners of the overwrap 1, or a single tab may be provided at a side of the overwrap. In the latter case, the rectangular sheet of overwrap of FIG. 1 wraps the pack 2 and the wrap is heat sealed at three sides, and then the front part 4 and the rear part 5 are fused together at a part intermediate of one side 7 of the overwrap 1 to form a square laminate of a desirable width and depth (FIG. 5). On both sides of this laminate there are formed two parallel slits 8 leaving laminated edges 9 of narrow width alongside the slits and thus defining a tab 6 therebetween. The overwrap 1 is then heated and allowed to shrink, when the laminated edges 9 on the outer sides of the slits 8 are pulled in the opposite directions away from each other, until they are aligned with the sealed part 3 on the side 7 of the overwrap 1 and in close contact with the corresponding side of the pack 2, as shown in FIG. 6, thereby leaving the tab 6 supported at the inner edge 6' by the side of the pack 2 and protruding as a while in the direction at a right angle thereto.

Figure 3:
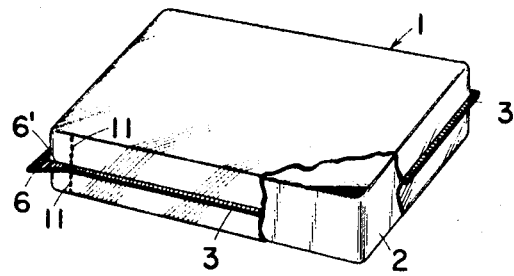
FIG. 3 is a perspective view, partly broken away, of a package formed in accordance with the present invention.
Figure 4:
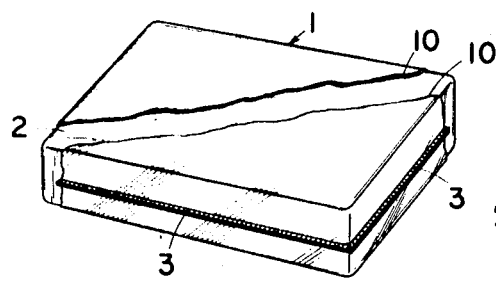
FIG. 4 is a perspective view of the overwrap of FIG. 3 as torn open.

It will be seen from the foregoing that, in accordance with the present invention, the overwrap 1 is allowed to contract by heating so that the entire wrap excepting the tab 6 shrinks into intimate contact with the pack 2 or other particle to be packaged, when the tab 6 is automatically formed as protruding sidewise from a side of the overwrap, as shown in FIGS. 3 and 4.

As the tab 6 thus formed is pulled upward or downward with some extra force, the overwrap 1 is torn open in two, as shown for example in FIG. 4, with two parallel tear lines 10 extending from the root of the tab and ending in the diagonally opposite corner.

Thus, according to the present invention, the tab 6 is automatically formed on thermal contraction of the overwrap 1 and there is no need of preforming anything like tab 6. This feature makes the packaging operation simple and efficient, and also economical because the material loss is reduced to a minimum. Moreover, the tab 6 is tough since it is twice as thick as the overwrap 1 itself. With these and other features, the invention proves very advantageous in practice.

Where necessary, perforations 11 may be formed over some lengths in opposite directions from the root of the tab 6 for the convenience in tearing the overwrap 1 by the tab 6.

In such a case the perforations 11 may be very short because they have to be simply long enough to direct the tear of the overwrap 1. Accordingly the amount of dirt or foreign matter that gains entrance into the package through the perforations 11 is very small and is totally negligible for practical purpose.

Although the present invention has so far been described in conjunction with the embodiments thereof in which the overwrap 1 employed is formed of a sheet folded in two, the overwrap 1 may also be in the form of a bag open on one side 1' only, as shown in FIGS. 7 and 8. Where the latter is preferred, a tab 6 is preformed in two ways. In one method, as illustrated in FIG. 7, the front part 4 and the rear part 5 of the bag-shaped overwrap 1 are joined together by fusion at a corner of the side opposite to the opening 1' to a triangular laminate. In the other method, as shown in FIG. 8, a square laminate of a desired width and depth is formed intermediate on one side of the bag-shaped overwrap 1, and two parallel slits 8 are provided, leaving narrow laminated edges 9 adjacent both sides of the laminate, so that the laminate defined between the two slits 8 can serve as a tab 6.

Here again, if necessary, the tab 6 may be provided with two parallel lines of perforations 11 from both ends of the root thereof.

Figure 2:
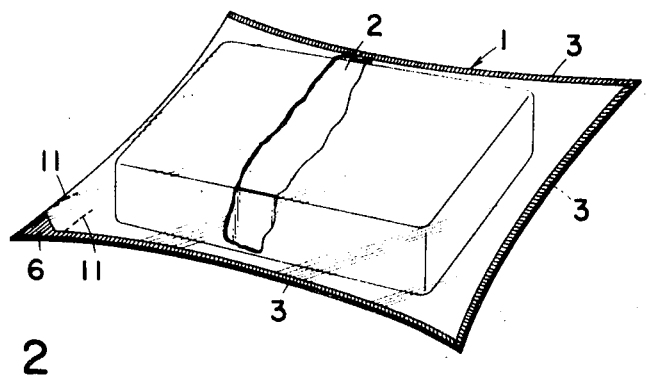
FIG. 2 is a perspective view, partly broken away, of the overwrap sealed at three sides thereby enclosing the article therein.

Such a bag-shaped overwrap 1, which has contained a pack or article 2 to be packaged, is sealed at the opening to the state of a hermetically sealed bag that contains the pack or article like the first or second embodiment of the present invention above described in the state shown in FIG. 2 or FIG. 5 of the accompanying drawings, respectively. Next, the sealed overwrap 1 is heated in the same manner as with either of the embodiments already described, whereby a package having the tab protruding sidewise and outwardly as shown in FIG. 3 or FIG. 6 is obtained.

I claim:

1. A method of packaging articles with a heat-shrinking material whereby a tear tab is automatically formed protruding sideways and substantially perpendicular from the package, which comprises the steps of wrapping an article in at least one sheet of wrapping material of a synthetic resin film which tends to shrink when heated, heat sealing the open sides of the wrapping material and forming a laminating tear tab of the front and rear parts of the wrapping material by fusion with said heat at a suitable portion on the peripheral surface of the wrapping material thereby hermetically sealing said article, and heating the wrapping material thereby allowing it to shrink in such a manner that the entire wrapping material except said laminated tear tab portion shrinks close to the outer surface of the article and that the inner edge of said laminated tear tab portion is supported by the outer surface of the article in a direction substantially at a right angle thereto, thereby allowing the laminated tear tab portion to extend outwardly.

2. A method of packaging articles with a heat-shrinking material whereby a tear tab is automatically formed protruding sidewise and substantially perpendicular from the package, which comprises laminating by fusion the front and rear parts of a bag-shaped overwrap of a heat-shrinking synthetic resin film which tends to shrink on heating into intimate contact with the outer surface of an article thereby packaging the same, forming along an edge of the overwrap, a laminated tear tab portion of the front and rear parts of said bag by fusion with said heat, slitting both side edges of the laminated tear tab portion so as to define said laminated tear tab portion from the rest of the bag-shaped overwrap, introducing an article to be packaged into the bag-shaped overwrap, heat sealing the open end of the bag, and heating the overwrap thereby causing shrinkage, in such a manner that the entire overwrap excepting said preformed laminated tear tab portion shrinks close to the outer surface of the article whereby the inner edge of said laminated tear tab portion is supported by the outer surface of the article in a direction substantially at a right angle thereto, thereby allowing the laminated tear tab portion to extend outwardly.

3. The method according to claim 1, wherein slits are formed on sides of said laminated tear tab portion leaving narrow laminated edges adjacent said laminated tear tab portion.

4. The method according to claim 1, wherein said laminated tear tab portion is formed at a corner of the wrapping material so as to form a triangular shaped tear tab.

5. The method according to claim 2, wherein said laminated tear tab portion is formed at a corner of the wrapping material so as to form a triangular shaped tear tab.

6. The method according to claim 1, including the step of forming the perforations for a short length from the root of said laminated tear tab and extending outwardly therefrom so as to direct and facilitate tearing open the package.

7. The method according to claim 2, including the step of forming the perforations for a short length from the root of said laminated tear tab and extending outwardly therefrom so as to direct and facilitate tearing open the package.

* * * * *